(No Model.)
J. M. SHARTLE.
DAMPENING DEVICE FOR CALENDER ROLLS.
No. 388,921. Patented Sept. 4, 1888.
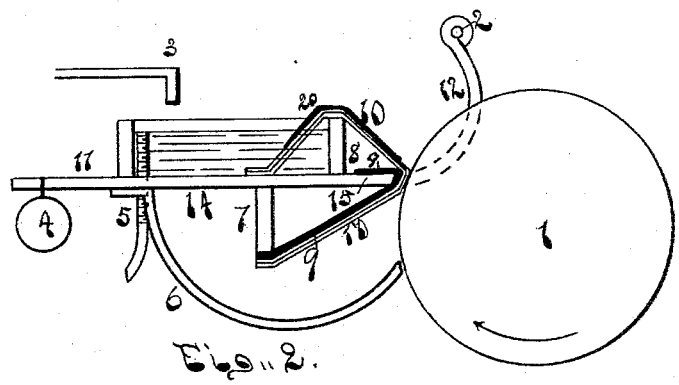
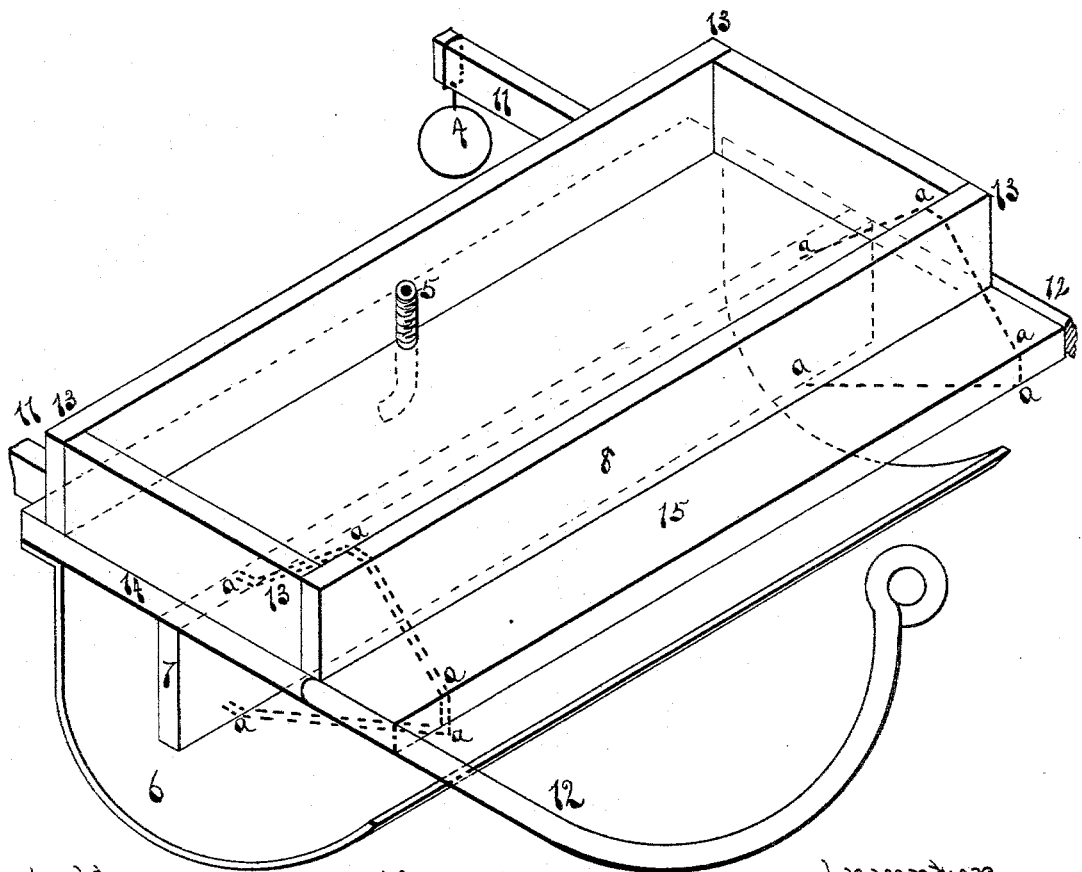
Witnesses
Lewis Torrey
H. C. Kadstate
Inventor
John M. Shartle
by E. J. Stoddard
Attorney

UNITED STATES PATENT OFFICE.

JOHN M. SHARTLE, OF JACKSON, MICHIGAN.

DAMPENING DEVICE FOR CALENDER-ROLLS.

SPECIFICATION forming part of Letters Patent No. 388,921, dated September 4, 1888.

Application filed January 11, 1887. Renewed January 25, 1888. Serial No. 261,894. (No model.)

*To all whom it may concern:*

Be it known that I, JOHN M. SHARTLE, of Jackson, in the county of Jackson and State of Michigan, have invented new and useful Improvements in Dampening Devices for Calender-Rolls, of which the following is a specification.

My invention relates to improved devices for dampening the material passing through calender-rolls.

The object of my improvements is to provide improved devices by which water or liquid coloring-matter can be supplied to the material passing through the rolls of a calendering-machine. I attain this object by the devices described in the following specification and illustrated in the accompanying drawings, in which—

Figure 1 is an isometric view of my improved devices detached from the calendering-machine. Fig. 2 is an elevation of my improved devices and one of the rolls of the calendering-machine. The end of the trough toward the observer is removed.

Similar reference-figures refer to similar parts throughout the several views.

13 13 13 8 14 are the sides, the end, and bottom of a box or trough adapted to hold the water or liquid coloring-matter which is to be supplied to the material passing through the rolls. The bottom 14 projects beyond the side of the box or trough which is toward the calender-roll when the device is secured in place, as shown at 15. The distance which the bottom projects is largely a matter of choice. I have made it about the height of the sides of the box. On the under side of the bottom 14, parallel to the calender-roll, is the projection or ridge 7, extending across the bottom 14. The relative height and position of the projection 7 will be determined by considerations hereinafter pointed out.

9 is a piece of felt, one end of which is fastened at the upper surface of the projecting portion 15 of the bottom 14, from whence the sheet 9 passes around said projecting portion of the bottom and is secured to the ridge 7. Over the sheet of felt 9 passes another sheet of the same material, (marked 10 in the drawings.) One edge of the sheet 10 is fastened along the ridge 7. Then said sheet passes around the projecting portion 15 of the bottom 14, over the side 8, and dips into the trough 13 13 13 8 14. The outline and position of the felt 10 are shown by the dotted lines in Fig. 1.

3 is a pipe through which water or liquid coloring-matter is supplied to the trough 13 13 13 8 14.

5 is a screw-threaded overflow-pipe.

6 is a trough for receiving and carrying away the drippings from the roll 1.

11 11 are handles by which the dampening device can be lifted out of contact with the smoothing-roll.

4 is a weight hung on the handles 11 11 to hold the felt in contact with the roll. These weights may or may not be necessary, depending on the particular device used.

The operation of my improved dampening device is as follows: The trough 13 13 13 8 14 is secured to the frame or standards of the stack of rolls of the calendering-machine by the arms 12 12 on the side of the roll away from which the top of the roll moves. Said arms are of such a length and so shaped that the trough 13 14, tending to turn about the point 2, shall press radially against the calender-roll, and are secured to the frame of the machine by a bar passing through the eyes 2. The sheet of felt, 9, is made of such a width that it will extend along the entire length of the roll 1. The sheet 10 is of the same width as the material passing through the rolls. The means for adjusting said sheets has been hereinbefore described. The ridge 7 should be of such a height and so situated on the bottom 14 that the part of the felts leading from the projection 15 to the said ridge shall conduct the drippings from the roll to the trough 6. About the right proportion is shown in the drawings.

The opening in the overflow-pipe 5 is adjusted by turning said pipe, and thus screwing it up or down through the bottom of the trough 13 8 14.

The water or liquid coloring-matter is supplied through the pipe 3 to the trough 13 8 14, and is conducted to the roll 1 by the capillary attraction of the felt 10, and thence to the material passing through the roll by the surface of said roll. The quantity of liquid conducted to the roll may be regulated by increasing or diminishing the depth of water in the trough by means of the adjustable overflow-pipe 5, or by increasing or diminishing the thickness of or number of layers of felt. If the sheet of felt 10 is not sufficient to supply the required amount of liquid, other sheets of the same material may be laid over 10, extending from near the roll 1 into the liquid in the trough 13 8 14, as shown at 20 in the drawings. Other porous material may of course be substituted for felt, and two devices may be used in order to dampen both sides of the material passing through.

Having fully described my invention, what I wish to claim and secure by Letters Patent is—

1. The combination, in a calendering-machine, of a trough for containing the dampening material, the bottom of said trough projecting beyond the side toward the calendering-roll, said trough being provided with the ridge 7 along its bottom, and sheet or sheets of felt or other porous material fastened to the bottom inside of said trough and passing over the side and projecting portion of the bottom, and being fastened to the ridge 7, said trough being provided with arms, by which it may be fastened to the frame of the machine in such a manner as to allow it to rotate about the point of fastening and press by its weight against the calender-roll, substantially as described.

2. The combination, with a calender-roll, of a trough for containing liquid, said trough being provided with the arms 12 12, the projecting bottom 14 15, the ridge or projection 7 along the bottom of said trough, the adjustable overflow-pipe 5, the drip-trough 6, the arms 11 11, and sheets of felt or other porous material, substantially as and for the purpose described.

3. The combination, with a calender-roll, of a trough for containing liquid, said trough being provided with the arms 12 12, the projecting bottom 14 15, the ridge or projection 7 along the bottom of said trough, the adjustable overflow-pipe 5, the drip-trough 6, and sheets of felt or other porous material, substantially as described.

4. The combination, with a calender-roll, of a trough for containing liquid, said trough being provided with the projecting bottom 14 15, the ridge or projection 7 along the bottom of said trough, the adjustable overflow-pipe 5, the drip-trough 6, and sheet of felt or other fibrous material, substantially as described.

5. The combination, with a calender-roll, of a trough for containing liquid, said trough being provided with the projecting bottom 14 15, the ridge or projection 7 along the bottom of said trough, the drip-trough 6, and sheet of felt, substantially as described.

JOHN M. SHARTLE.

Witnesses:
JOSIAH B. FROST,
WILLIAM T. GIBSON.